(12) United States Patent
Padmanabhan et al.

(10) Patent No.: US 8,271,814 B2
(45) Date of Patent: Sep. 18, 2012

(54) MIGRATING A CLIENT COMPUTER TO A VIRTUAL MACHINE SERVER WHEN THE CLIENT COMPUTER IS DEEMED TO BE IDLE

(75) Inventors: Venkata N. Padmanabhan, Bangalore (IN); Ramachandran Ramjee, Bangalore (IN); Tathagata Das, Bangalore (IN); Pradeep Padala, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 12/729,194

(22) Filed: Mar. 22, 2010

(65) Prior Publication Data

US 2011/0231680 A1    Sep. 22, 2011

(51) Int. Cl.
- G06F 1/32 (2006.01)
- G06F 9/455 (2006.01)
- G06F 9/46 (2006.01)

(52) U.S. Cl. ............ 713/310; 713/320; 713/323; 718/1; 718/100

(58) Field of Classification Search .................. 713/310, 713/320, 323; 718/1, 100
See application file for complete search history.

(56) References Cited

U.S. PATENT DOCUMENTS

| | | | |
|---|---|---|---|
| 7,356,677 B1 | 4/2008 | Rafizadeh | |
| 7,543,166 B2 * | 6/2009 | Zimmer et al. | 713/310 |
| 2006/0143290 A1 * | 6/2006 | Dostert et al. | 709/224 |
| 2008/0104587 A1 * | 5/2008 | Magenheimer et al. | 718/1 |
| 2009/0119396 A1 | 5/2009 | Kanda | |
| 2009/0300381 A1 * | 12/2009 | Chen et al. | 713/310 |
| 2011/0004680 A1 * | 1/2011 | Ryman | 709/224 |
| 2011/0055830 A1 * | 3/2011 | Kamay et al. | 718/1 |

FOREIGN PATENT DOCUMENTS

| | | |
|---|---|---|
| WO | 2009120880 A2 | 5/2009 |
| WO | 2009150896 A1 | 6/2009 |

OTHER PUBLICATIONS

Bila et at., "The Case for Energy-Oriented Partial Desktop Migration", USENIX Federated Conferences Week, Boston. I MA (Jun. 22, 2010).*

Agarwal, Y., S. Hodges, R. Chandra, J. Scott, P. Bahl, R. Gupta, Somniloquy: Augmenting network interfaces to reduce PC energy usage, Proc. of the 6th USENIX Symposium on Networked Systems Design and Implementation, Apr. 2009, pp. 365-380, Boston, MA, USA.

(Continued)

*Primary Examiner* — Vincent Tran
(74) *Attorney, Agent, or Firm* — Lyon & Harr, LLP; Richard T. Lyon

(57) ABSTRACT

Energy saving virtualization technique embodiments are presented that save energy by virtualizing a network-connected client computer's computing session (or a part thereof) as a virtual machine (VM) and then migrating it between the client computer and a VM server, depending on whether the computing session is active or idle. The client computer VM is migrated to the VM server when the client computer is deemed to be idle, and the VM is migrated back when the client computer is deemed to have re-entered an active condition. When the VM has been migrated away from the client computer and is residing on the VM server, the client computer is put into a sleep mode, thereby saving energy. However, the user's computing session remains alive on the VM server so that ongoing network connections and other activity are not disturbed.

20 Claims, 8 Drawing Sheets

OTHER PUBLICATIONS

Bradford, R., E. Kotsovinos, A. Feldmann, H. Schiöberg, Live wide-area migration of virtual machines including local persistent state, Proc. of the 3rd Int'l Conf. on Virtual Execution Environments, Jun. 2007, pp. 169-179, San Diego, California, USA.

CDW-G, Going Green in K-12, retrieved Dec. 24, 2009 from http://www.edtechmagazine.com/sites/edtechmagazine.com.k12/files/legacy_images/2009/updates/62856-white-paper-final.pdf.

Chase, J. S., D. C. Anderson, P. N. Thakar, A. Vahdat, R. P. Doyle, Managing energy and server resources in hosting centres, Proc. of the 18th ACM Symposium on Operating System Principles, Oct. 2001, pp. 103-116, vol. 35, No. 5, Chateau Lake Louise, Banff, Alberta, Canada.

Clark, C., K. Fraser, S. Hand, J. G. Hansen, E. Jul, C. Limpach, I. Pratt, A. Warfield, Live migration of virtual machines, Proceedings of the 2nd Symposium on Networked Systems Design and Implementation, May 2007, Boston, Massachusetts, USA.

Compulink Management Center, Inc, Enterprise deployment: Laserfiche 8 in a virtual environment, White Paper, Aug. 2008.

Grit, L., D. Irwin, A. Yumerefendi, J. Chase, Virtual machine hosting for networked clusters: Building the foundations for "autonomic" orchestration, First Int'l Workshop on Virtualization Tech. in Distributed Computing, Nov. 2006, Department of Computer Science, Duke University.

VMBLOG.COM, VMware vSphere 4 Slashes Power Use in the Datacenter With Distributed Power Management, retrieved Dec. 24, 2009 from http://vmblog.com/archive/2009/07/21/vmware-vsphere-4-slashes-power-use-in-the-datacenter-with-distributed-power-management.aspx.

Moore, J. D., J. S. Chase, P. Ranganathan, R. K. Sharma, Making scheduling "cool": Temperature-aware workload placement in data centers, Proc. of the 2005 USENIX Annual Technical Conference, Apr. 2005, pp. 61-75, Anaheim, CA, USA.

Nathuji, R., K. Schwan, VirtualPower: Coordinated power management in virtualized enterprise systems, Proc. of the 21st ACM Symposium on Operating Systems Principles, Oct. 2007, pp. 265-278, Washington, USA.

Nedeveschi, S., J. Chandrashekar, J. Liu, B. Nordman, S. Ratnasamy, N. Taft, Skilled in the art of being idle: Reducing energy waste in networked systems, Proc. of the 6th USENIX Symposium on Networked Systems Design and Implementation, Apr. 2009, pp. 381-394, Boston, MA, USA.

Nordman, B., K. Christensen, Greener PCs for the enterprise, IT Pro, Jul./Aug. 2009, IEEE Computer Society.

Srikantaiah, S., A. Kansal, F. Zhao, Energy aware consolidation for cloud computing, Proc. of the 2008 Conf. on Power Aware Computing and Sys's, Dec. 2008, USENIX Association Berkeley, CA, USA.

Stoess, J., C. Lang, F. Bellosa, Energy management for hypervisor-based virtual machines, Proc. of the 2007 USENIX Annual Technical Conf., Jun. 2007, pp. 1-14, Santa Clara, CA, USA.

Tian, K., K. Yu, J. Nakajima, W. Wang, How virtualization makes power management different, Proc. of the Linux Symposium, Jun. 2007, pp. 205-214, Ottawa, Ontario, Canada.

Tolia, N., Z. Wang, M. Marwah, C. Bash, P. Ranganathan, X. Zhu, Delivering energy proportionality with non energy-proportional systems—Optimizing the ensemble, Proc. of the Workshop on Power Aware Computing and Sys's, Dec. 2008, San Diego, CA, USA.

Waldspurger, C. A., Memory resource management in VMware ESX server, Proc. of the 5th Symposium on Operating Sys's Design and Implementation, vol. 36, issue SI, Dec. 2002, ACM New York, NY, USA.

Wood, T., P. J. Shenoy, A. Venkataramani, M. S. Yousif, Black-box and gray-box strategies for virtual machine migration, Proc. of the 4th Symposium on Networked Sys's Design and Implementation, Apr. 2007, Cambridge, Massachusetts, USA.

* cited by examiner

MIGRATING A CLIENT COMPUTER TO A VIRTUAL MACHINE SERVER WHEN THE CLIENT COMPUTER IS DEEMED TO BE IDLE

BACKGROUND

The energy consumed by the burgeoning computing infrastructure worldwide has recently drawn significant attention. While the focus of energy management has been on the datacenter setting, attention has also been directed recently to the significant amounts of energy consumed by desktop computers in homes and enterprises. It is estimated that personal computers (PCs) and their monitors consume about 100 terawatt-hours (TWh) per year, which makes up about 3% of the annual electricity consumed in the U.S. Of this, 65 TWh/year is consumed by PCs in enterprises, which makes up about 5% of the commercial building electricity consumption. More particularly, a typical desktop PC consumes about 80-110 W when active and 60-80 watts (W) when idle, excluding the monitor, which adds another 35-80 W.

A common approach to reducing PC energy costs is to put a computer to sleep when it is idle. In view of this, multiple S ("sleep") states have been defined as part of the Advanced Configuration and Power Interface (ACPI) standard. In particular, the S3 state ("standby") suspends the machine's state to RAM, thereby cutting energy consumption to 2-3 W. The S3 state has the advantage of being much quicker to transition in and out of than S4 ("hibernate"), which involves suspending the machine's state to disk.

SUMMARY

The energy saving virtualization technique embodiments described herein save energy by virtualizing a network-connected client computer's computing session (or a part thereof) as a virtual machine (VM) and then migrating it between the client computer and a VM server, depending on whether the computing session is active or idle. When the VM has been migrated away from the client computer, the client computer is put into a sleep mode, thereby saving energy. However, the user's computing session remains alive on the VM server so that ongoing network connections and other activity are not disturbed.

One general implementation involves the client computer virtualizing its computing session (or a portion thereof) in the form of a virtual machine. In addition, the client computer periodically sends information indicative of its current level of activity to the VM server. The VM server receives the information indicative of the client computer's current level of activity and uses this information to determine if the client computer has entered an idle condition. If it is determined that the client computer has entered an idle condition, an instruction is sent to the client computer to migrate its VM to the VM server. The VM server then receives the client computer VM, and sends an instruction to the client computer to initiate the aforementioned energy saving sleep mode. The client computer then initiates the energy saving sleep mode.

With regard to waking a client computer from its energy saving sleep mode and migrating its VM back from the VM server, one general implementation involves the server monitoring the condition of the client computer and determining if it has re-entered an active condition. If it is determined that the client computer has re-entered an active condition, then the client computer VM is migrated back to the client computer.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of energy saving virtualization technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Energy Saving Virtualization For Networked Computers

The energy saving virtualization technique embodiments described herein for network-connected computers save energy by virtualizing a client computer's computing session as a virtual machine (VM) and then migrating it between the client computer and a VM server, depending on whether the computing session is active or idle. For example, when the client computer becomes idle, say when the user steps away for several minutes (e.g., for a coffee break), the computer's VM is migrated away to the VM server and the computer is put to sleep. When the computer becomes active again (e.g., when the user returns and begins to use the computer), its VM is migrated back. In this way, the user's computing environment remains alive (i.e., it is "always on") so ongoing network connections and other activity (e.g., background downloads) are not disturbed, regardless of the application involved. This is true whether the VM has been migrated to the VM server, or resides in the client computer, or is in the process of being migrated to the VM server or back. During those times the client computer is asleep, a considerable amount of energy is being saved as discussed previously. It is noted that the client computer can be any computing device, such as those mentioned in the Computing System Environment section of this description.

Figure 1:
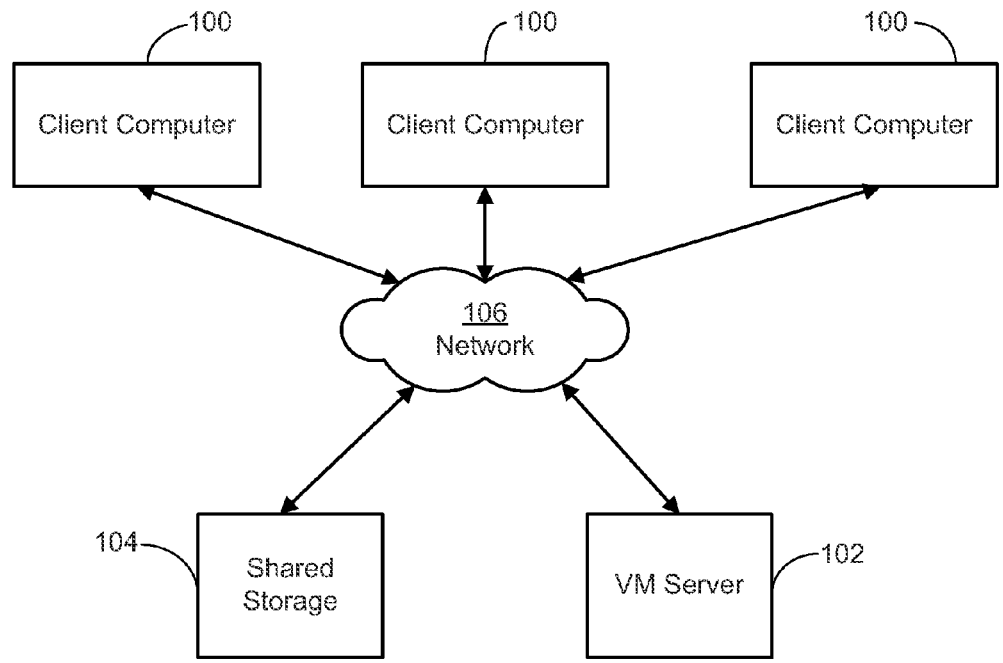
FIG. 1 is a diagram depicting an exemplary high-level computer network architecture for implementing the energy saving virtualization technique embodiments described herein.

FIG. 1 shows a high-level architecture of a suitable computer network environment for implementing the energy saving virtualization technique embodiments described herein. Generally, a typical computer network computing infrastructure having multiple client computers 100 (three of which are shown) is augmented with a virtual machine (VM) server 102 and a shared storage node 104. There could be more than one VM server and/or shared storage node, although only one of each is shown in FIG. 1 for the sake of simplicity. All the foregoing elements 100, 102, 104 are connected via a computer network 106.

Each client computer 100, as well as the VM server 102 runs a virtual machine monitor (VMM) module or hypervisor module as it is sometimes called. A hypervisor module is a software layer that supports one or more VMs, each of which provides the illusion of the underlying physical computing device. Each VM runs a full-blown OS just as if it were running directly on a physical device. The current state-of-the-art hypervisor is often referred to as a type-1 "bare metal" hypervisor. This type of hypervisor runs directly and efficiently on the underlying computer hardware (either a client computer 100 or VM server 102) by leveraging hardware support that is widely available in processors shipped in the past 2-3 years. Thus, in the case of the energy saving virtualization technique embodiments described herein, the hypervisor module running on a client computer 100 hosts a VM in which a client's operating system (OS) runs. This VM is migrated from a client computer 100 to the VM server 102 when the client computer is not active. Once the VM is migrated to the VM server 102, the client computer 100 is put to sleep in a normal manner to save energy. The hypervisor module running on the VM server 102 hosts the guest VMs for the client computers 100 that have been migrated to it.

When a user begins to use a client computer 100 whose VM has been migrated to the VM server 102, the client computer is woken up and the VM is migrated back to the client computer. As will be explained later is this description, in one embodiment a live migration technique is employed for this task. To insulate a client computer's user from disruptions due to VM migrations, in one implementation, the client computer hypervisor program also runs a remote desktop (RD) client, which is used to connect to, and remain connected to, the VM, regardless of whether it is running on the client computer or on the VM server.

Each client computer's VM uses, in lieu of a local disk, the aforementioned shared storage node 104, which is also shared with the VM server 102. It is noted that this aspect of the architecture arises from limitations in current hypervisor programs and can be done away with once live migration techniques with local virtual hard disk (VHD) support become available. More particularly, the live migration technique that will be described shortly currently assumes that the shared storage node 104 is shared between a client computer 100 and the VM server 102, say for example in the form of network attached storage (NAS). This avoids the considerable cost of migrating disk content. However, it has been demonstrated recently that the migration of VMs with local VHDs using techniques such as pre-copying and mirroring of disk content can keep downtime to less than 3 seconds in a local area network (LAN) setting.

The VM server 102 also includes a controller module. The controller module receives periodic updates from stubs resident on each client computer's hypervisor module. These stubs provide information about the level of user and computing activity on a client computer 100. The controller module also tracks resource usage on the VM server 102. Using this information, the controller module orchestrates the migration of VMs to the VM server 102 and back to the client computers 100, and manages the allocation of resources on the VM server. It is noted that in general the aforementioned VM server resource usage could involve the use of resources such as the central processor unit (CPU), disks, memory, network, and so on, or any combination thereof. However, it is believed that CPU usage is a good indicator of the overall server resource usage, and as such will be employed as an example in the description that follows when a measure of the VM server resource usage is needed. On the other hand, even though CPU usage will be used as an example, it is not intended to limit the embodiments described herein to just that measure of VM server resource consumption. As stated above, the measure could involve other indicators or combination of indicators.

Figure 2:
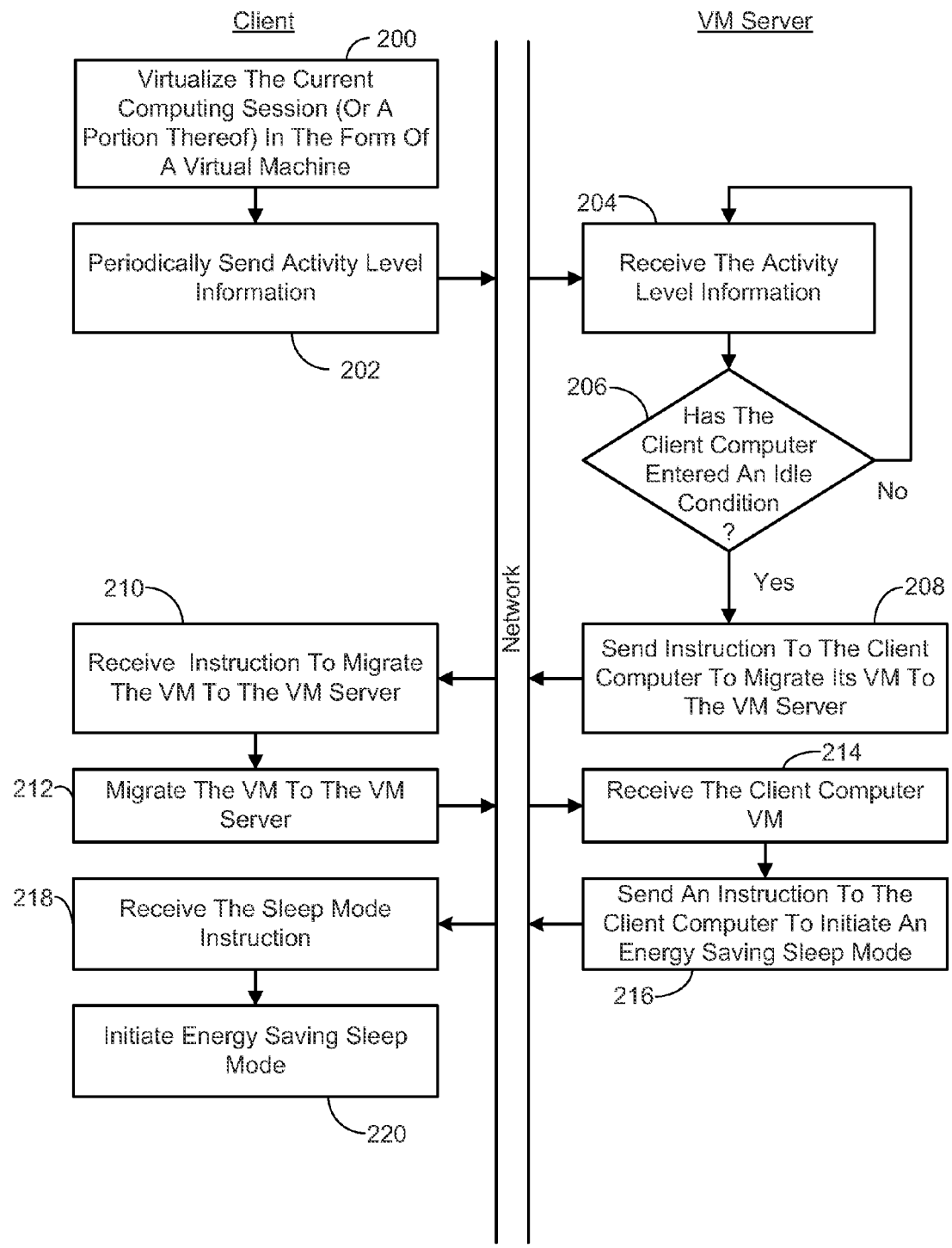
FIG. 2 is a flow diagram that generally outlines one implementation of a computer-implemented process for migrating the client computer virtual machine (VM) to the VM server and putting the client computer into sleep mode.

The foregoing architecture can be employed to realize the energy saving virtualization technique embodiments described herein. One general implementation for migrating the client computer VM to the VM server and putting the client computer into sleep mode uses the following process, as illustrated in FIG. 2. In this exemplary process, computers (such as the computing devices described in the Computing Environment section provided later in this specification) are employed to perform a series of process actions. More particularly, the aforementioned client computer and virtual machine (VM) server are used. The client computer is first used to virtualize the client computer's computing session (or a portion thereof) in the form of a virtual machine (200). In addition, the client computer periodically sends information indicative of its current level of activity to the VM server (202). The VM server receives the information indicative of the client computer's current level of activity (204) and uses this information to determine if the client computer has entered an idle condition (206). If it is determined the client computer has not entered an idle condition, the client computer's activity level continues to be monitored by repeating actions (204) and (206). If, however, it is determined that the client computer has entered an idle condition, an instruction is sent to the client computer to migrate its VM to the VM server (208). The client computer receives the instruction from the virtual machine server (210) and migrates its VM to the VM server (212). The VM server then receives the client computer VM (214), and sends an instruction to the client computer to initiate an energy saving sleep mode (216). The client computer receives the sleep mode instruction from the VM server (218) and then initiates the energy saving sleep mode (220).

Figure 3:
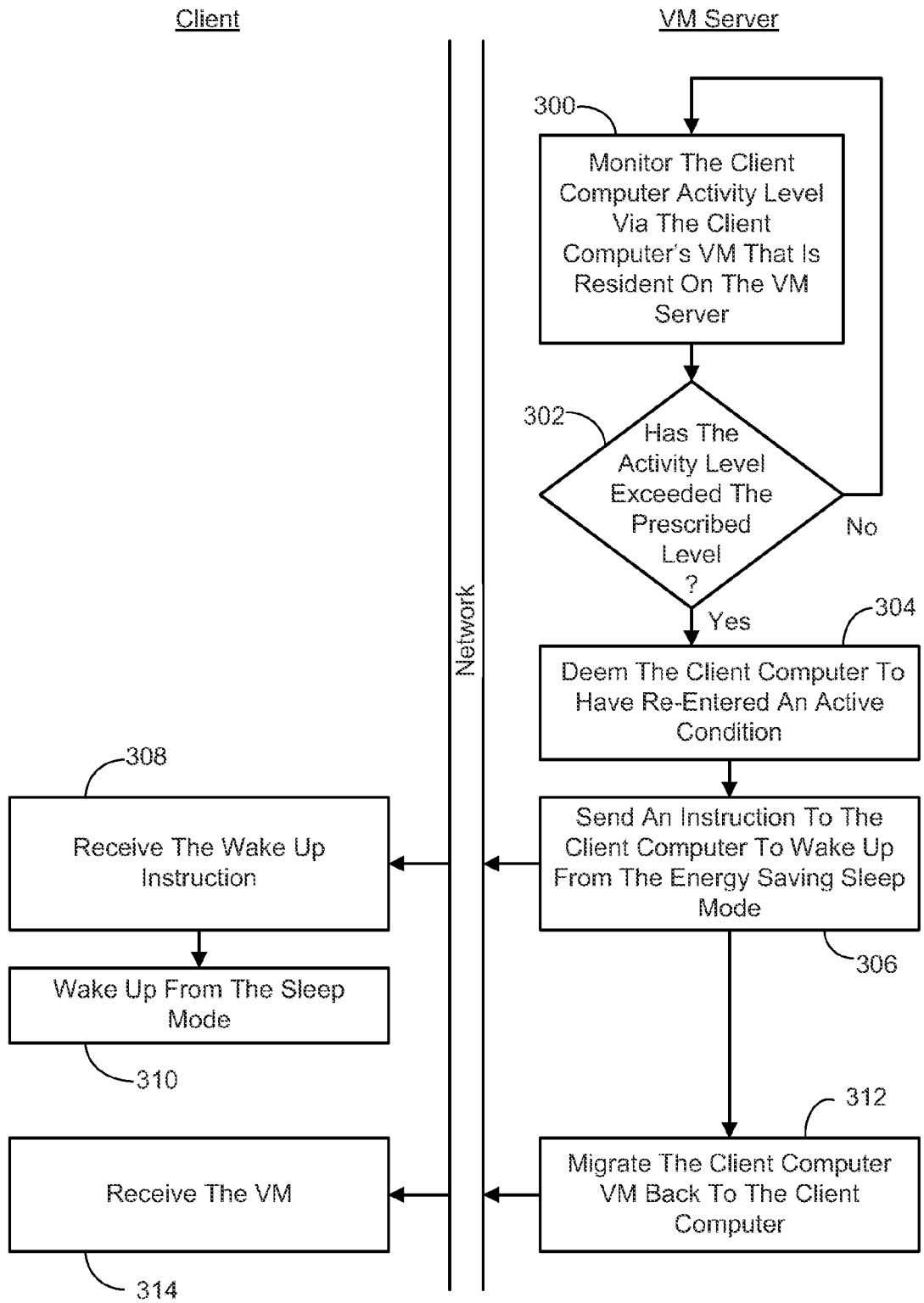
FIG. 3 is a flow diagram that generally outlines one implementation of a computer-implemented process for determining if the client computer has re-entered an active condition and migrating the client computer VM back to the client computer, where the VM server instructs the client computer to wake up from the energy saving sleep mode.

With regard to waking a client computer from its energy saving sleep mode and migrating its VM back from the VM server, generally the server monitors the condition of the client computer and determines if it has re-entered an active condition. If it is determined that the client computer has re-entered an active condition, then the client computer VM is migrated back to the client computer. This general process can be implemented in a number of ways. For example, one way involves the VM server instructing the client computer to wake up from the energy saving sleep mode. This scenario is illustrated in the exemplary process outlined in FIG. 3. In this exemplary process, the server monitors the activity level associated with the client computer via the client computer's virtual machine that is resident on the virtual machine server (300), and determines if the activity level has exceeded a prescribed level (302). If the client computer VM's activity level does not exceed this prescribed level, then the monitoring continues as shown in FIG. 3. If, however, it is determined that the client computer VM's activity level exceeds the aforementioned prescribed level, then the client computer is deemed to have re-entered an active condition (304). An instruction is then sent by the VM server to the client computer to wake up from the energy saving sleep mode (306). The client computer receives the wake up instruction (308), and wakes from the sleep mode (310). The VM server then migrates the client computer VM back to the client computer (312) and the client computer receives it (314).

Figure 4:
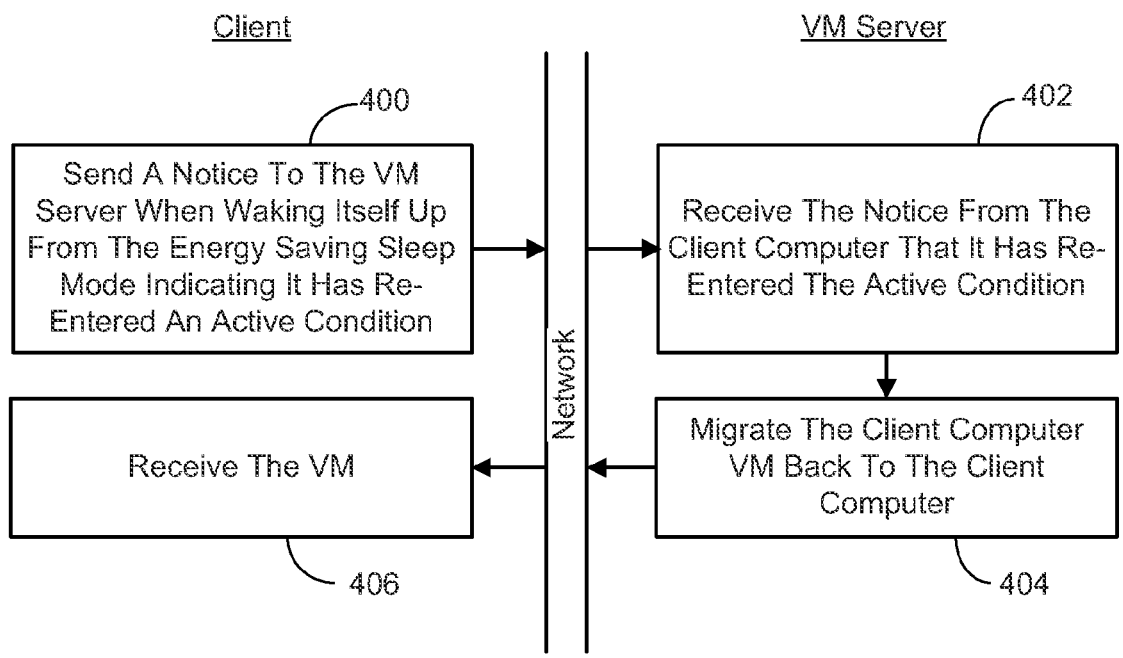
FIG. 4 is a flow diagram that generally outlines one implementation of a computer-implemented process for determining if the client computer has re-entered an active condition and migrating the client computer VM back to the client computer, where the client computer wakes itself up from the energy saving sleep mode.

Further, in some embodiments, the client computer has the ability to wake itself up under certain circumstances independent of the actions of the VM server. This scenario is illustrated in the exemplary process outlined in FIG. 4. In this exemplary process, the client computer sends a notice to the VM server when it wakes itself up from the energy saving sleep mode indicating it has re-entered an active condition (400). The VM server receives the notice from the client computer that it has re-entered the active condition (402), and then migrates the client computer VM back to the client computer (404) which receives it (406).

The aforementioned circumstances causing the client computer to wake itself up from the energy saving sleep mode can be any desired. In general, it can be advantageous to wake the client computer from the energy saving sleep mode if it is suspected the user will be working on it in the near future For example, the client computer can wake up when the user is detected within a prescribed vicinity of the client computer. The client computer could also be woken up upon the occurrence of a prescheduled event, and/or at a prescheduled time.

The energy saving virtualization technique embodiments described herein have many advantages. As indicated previously, a client computer's VM is migrate between the client computer and a VM server, depending on whether the client computer is being actively used or is idle. In this way, the user's computing session is "always on," thereby maintaining its network presence even when the user's physical client computer is switched off to save energy. Further, this "always on" feature allows energy savings whenever the opportunity arises, without having to worry about disrupting the user. Besides long idle periods (e.g., nights and weekends), energy can also be saved by putting the physical client computer to sleep even during short idle periods, such as when a user goes to a meeting or steps out for coffee. It is believed that the potential energy savings from exploiting short idle periods can be significant.

It is noted the foregoing advantages are realized while still providing an undisrupted computing experience to user of the client computer, despite the effects of the VM and its migration. A user will typically care about preserving long-running network connections (e.g., login sessions, IM presence, file sharing), background computation (e.g., syncing and automatic filing of new emails), and keeping their computer reachable even while it is idle. Putting a computer to sleep can cause disruption (e.g., broken connections), thereby having a negative impact on the user, who might then choose to disable the energy savings mechanism altogether. Thus, by ensuring an undisturbed computing experience, the user will not be tempted to forego the energy savings the technique embodiments described herein can provide.

1.1 Idle and Active Conditions

It is noted that what is considered idle and active conditions in a client computer can be defined in many ways. In one implementation of the energy saving virtualization technique embodiments described herein, the determination of whether a client computer has entered an idle condition from an active condition is based on whether there has been a lack of user interface (UI) activity within a prescribed period of time (e.g., 10 minutes). If no UI activity (e.g., keyboard and/or mouse usage) is detected for the prescribed period, the client computer would be deemed to be in an idle condition. Alternately, in another more conservative implementation, the determination of whether a client computer has entered an idle condition is based on whether there has been not only no user interface (UI) activity within a prescribed period, but also that the central processing unit (CPU) usage of the client computer was below a prescribed threshold (e.g., 10%) during the same period. The VM server can ascertain the UI activity and client computer CPU usage from the information periodically provided by the client computer via the aforementioned stubs. If both of these conditions exist, then the client computer would be deemed to be in an idle condition.

With regard to determining if a client computer has re-entered an active condition from an idle condition, a similar scheme can be employed. In one implementation, the determination is based on whether there has been UI activity within a prescribed period of time (e.g., 10 minutes). If UI activity is detected for the prescribed period, the client computer would be deemed to have re-entered an active condition. The UI activity of the client computer is monitored by the VM server via the client computer's VM (which is resident on the server). Alternately, in a more conservative implementation, even if there has been no UI activity within the prescribed period, the determination of whether a client computer has re-entered an active condition is further based on whether the portion of the VM server's central processing unit (CPU) usage attributable to the VM of the client computer exceeds a prescribed threshold (e.g., 10%) during the same prescribed period. Thus, if either UI activity is detected, or the server's CPU usage attributable to a client computer's VM exceeds the prescribed threshold, the client computer would be deemed to have re-enter an active condition from an idle condition.

While it is believed the foregoing definitions of the idle and active conditions for a client computer are good indicators that the computer is being or is not being used, it is not intended that the energy saving virtualization technique embodiments described herein be limited to only those definitions. Rather, other definitions of activeness and idleness can be employed as desired in the determination of whether a client computer is in an active or idle condition.

It is noted that in some implementations, in order to avoid too much bouncing between the active and idle states, a hysteresis is introduced into the idle/active determination. More particularly, in one implementation, the CPU usage (either the client computer's CPU usage in the case of an idleness determination, or the portion of the VM server's CPU usage attributable to the resident VM of the client computer in the case of an activeness determination) is measured as the average over a prescribed averaging period (e.g., 1 minute) rather than instantaneously. In another implementation, a higher CPU usage threshold is used when determining if a client computer has transitioned from an idle condition back to an active condition, than when determining if a client computer has entered an idle condition. The CPU usage in this later implementation can be measured instantaneously, or averaged over a prescribed interval. This multiple threshold implementation will be described in more detail later in this description.

The addition of the foregoing hysteresis in determining whether a VM is active or idle has advantages. For example, it avoids a condition where a temporary surge in CPU usage such as sometimes occurs right after live migration confuses the controller. More particularly, it has been found that for a period of 2-3 minutes after the completion of live migration, there is a surge in the CPU usage of a VM, with the VM sometimes saturating its virtual processor. This surge might be due to the final copying phase of live migration. If the CPU usage is being considered in determining whether a VM is active or idle and if the VM has just been pulled into the VM server, the surge in CPU usage could trigger the controller module to incorrectly conclude that the VM is active again and push it back immediately. Adding a few minutes of hysteresis avoids this confusion by allowing time for the surge to subside.

1.2 Live Migration

In one embodiment, live migration techniques are employed to migrate a client computer's VM to and from the VM server in order to ensure an undisrupted computing experience for the user. Live migration is a feature supported by most currently available hypervisor programs. Efficient live migration over a high-speed LAN or wide area network (WAN) is performed by iterative copying of memory pages while the VM continues execution, before finally the VM is paused briefly (e.g., for as short as 60 ms) to copy the remaining pages and resume execution on the computer to which the VM is being migrated (i.e., either a client computer or the VM server).

In operation, no matter whether the VM is at the server or a client computer, users always access it through a remote desktop (RD) session. So, in a typical scenario, when a user begins using a client computer that has been put to sleep, the computer is woken up and the user is able to immediately access their computing session (whose state is fully up-to-date, because it has been "always on") through a RD connection to the VM running on the VM server. Subsequently, the VM is migrated back to the user's client computer without the user even noticing.

1.3 Migration Timing and Server Capacity Constraints

The energy saving virtualization technique embodiments described herein also generally determine when and which VMs to migrate to/from the VM server when there are multiple client computers being managed. This is done so as to maximize energy savings while minimizing disruption to users. To this end, the aforementioned controller module runs on the VM server and carefully balances migrations based on two continuously updated lists. The first of these lists is a "push" list. A VM found in this first list is a VM that was previously migrated to the VM server, but that now needs to be migrated back to its corresponding client computer which has become active again. This migration back occurs as soon as possible to minimize user disruption. The second of the lists is a "pull" list. A VM found in this second list is eligible to be migrated to the VM server from an idle client computer, but subject to server capacity constraints.

In one implementation, the controller module operates as follows. Based on information gathered from client computer stubs, the controller module determines which client computers, if any, have become idle, and adds their VMs to the pull list. Furthermore, based both on information gathered from the stubs and from local monitoring on the VM server, the controller module determines which client computers, if any, have become active again and adds their VMs to the push list. If the push list is not empty, the VMs associated with newly active client computers are migrated back to the desktop right away. If the pull list is not empty and the VM server has the storage capacity available, additional VMs on the list are migrated to the server.

It is noted that in the foregoing determinations as to whether a client computer has become idle or active again, if CPU usage is considered as described previously, the CPU usage threshold can be the same for both transitions (e.g., 10%), or different. If the thresholds are different, in one implementation, the threshold employed for adding a client computer to the push list $c_{push}$ (i.e., idle→active transition of a VM currently on the VM server) would be larger than the threshold employed for adding a client computer to the pull list $c_{pull}$ (i.e., for a VM currently on a client computer). For example, $c_{push}$ could be set to 20 percent, and $c_{pull}$ could be set to 10 percent. This multiple threshold arrangement has the advantage of avoiding too much bouncing between the active and idle states, as indicated previously.

Figure 5:
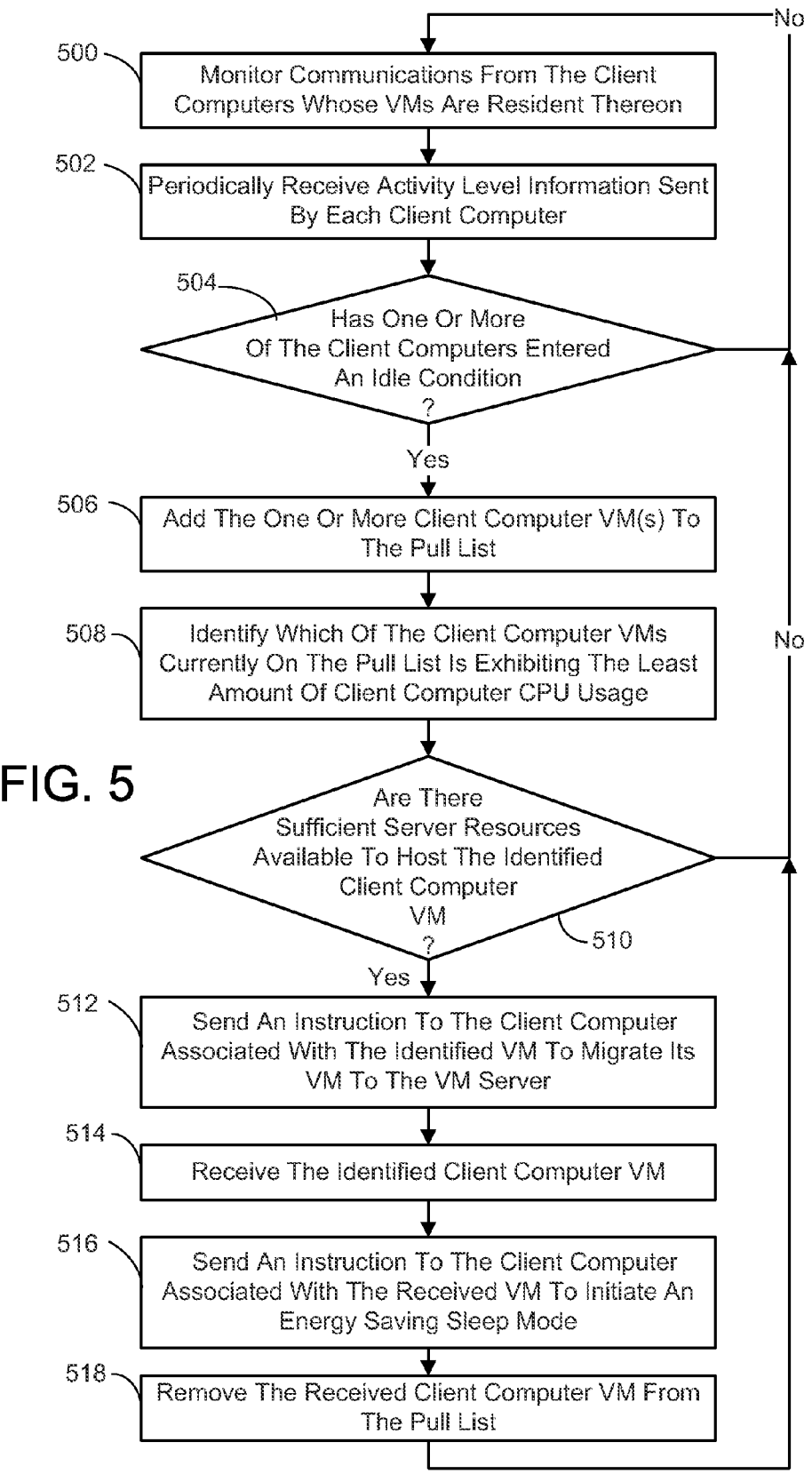
FIG. 5 is a flow diagram that generally outlines one implementation of a computer-implemented process for the VM server to determine when and which client computer VMs to migrate to the VM server.

In view of the foregoing, one general implementation for determining when and which VMs to migrate to the VM server when there are multiple client computers being managed, uses the following process, as illustrated in FIG. 5. In this exemplary process, the aforementioned VM server is used to monitor communications from the client computers whose VM is still resident on the associated client computer (500), and receive information periodically sent by each client computer that is indicative of a current level of activity of that client computer (502). The VM server then determines if one or more of the client computers has entered an idle condition (504). In this exemplary implementation, a client computer is deemed to have entered the idle condition if it exhibits an activity level that falls below a first prescribed level. If no client computer is deemed to have entered the idle condition, then the monitoring and processing of the activity level information associated with that computer is continued as shown in FIG. 5. If, however, one or more client computers are deemed to have entered the idle condition, their VM(s) are added to the aforementioned pull list (506).

The VM server next identifies which of the client computer VM currently on the pull list is exhibiting the least amount of client computer CPU usage (508). If there is only one client computer VM on the pull list, then that VM is identified as exhibiting the least amount of client computer CPU usage. The VM server then determines if there are sufficient server resources available to host the identified client computer VM (510). If not, then actions (500) through (510) are repeated until sufficient server resources become available. When it is determined that there are sufficient server resources available, an instruction is sent to the client computer associated with the identified VM to migrate that client computer's VM to the VM server (512). The VM server then receives the identified client computer VM from the associated client computer (514) and sends an instruction to that client computer to initiate an energy saving sleep mode (516). In addition, the received client computer VM is removed from the pull list (518) and the aforementioned monitoring continues.

Figure 6:
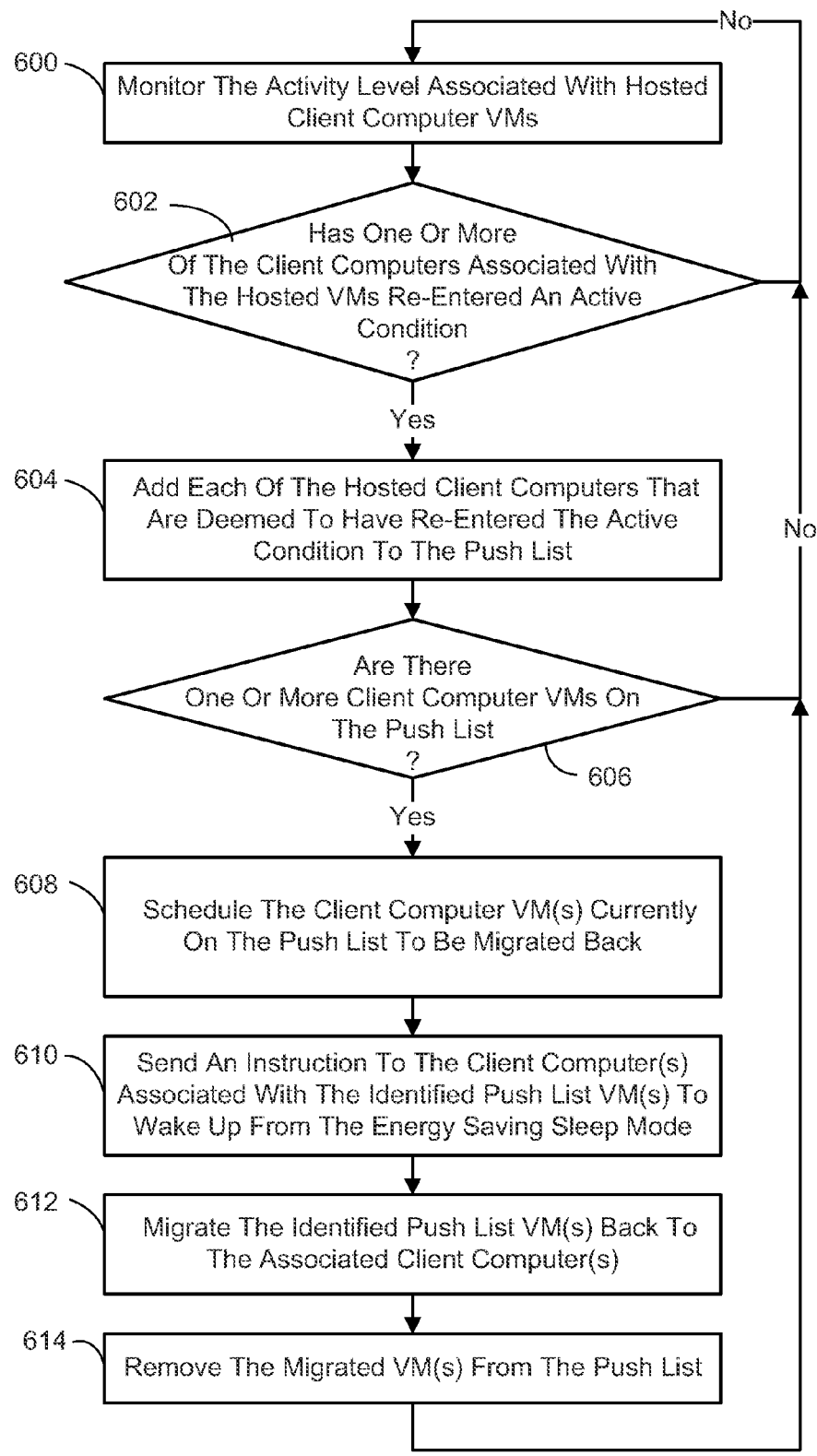
FIG. 6 is a flow diagram that generally outlines one implementation of a computer-implemented process for the VM server to determine when and which client computer VMs currently hosted on the server to migrate back to their associated client computers.

With regard the VM server managing multiple client computer VMs that have been migrated and hosted on the server, one general implementation for determining when and which VMs to migrate back, uses the following process, as illustrated in FIG. 6. In this exemplary process, the VM server monitors the activity level associated with the hosted client computer VMs (600), and determines if one or more of the client computers has re-entered an active condition (602). In this exemplary implementation, a client computer is deemed to have re-entered an active condition if its VM exhibits an activity level that exceeds a second prescribed level, where this second prescribed activity level is higher than the aforementioned first prescribed activity level used in determining if a client computer has become idle. If none of the hosted client computers are deemed to have re-entered the active condition, then the monitoring of the VM activity levels continues as shown in FIG. 6. However, for each of the hosted client computers that are deemed to have re-entered the active condition, it is added to a push list (604).

The VM server periodically determines if there is one or more client computer VMs on the push list (606). If not, the activity level monitoring continues. However, if one or more client computer VMs are on the push list, the VM server schedules the client computer VM(s) currently on the push list to be migrated back (608). The VM server then sends an instruction to the client computer(s) associated with the identified push list client computer VM(s) to wake up from the energy saving sleep mode (610), and migrates the identified client computer VM(s) back to the associated client computer(s) (612). In addition, the VM server removes the migrated VM(s) from the push list (614), and the activity level monitoring continues.

It is possible under certain circumstances that there would be no client computer VMs that have re-entered the active condition and been placed on the push list. In one implementation, no action would be taken in the foregoing situation unless the VM server CPU usage exceeds a prescribed CPU usage push threshold. However, if the VM server CPU usage exceeds the prescribed CPU usage push threshold, then one or more client computer VMs resident on the server are migrated back to their respective client computers. This is done in descending order of the client computer VMs' consumption of the VM server CPU resources, until the VM server CPU usage falls to a level below the prescribed CPU usage push threshold.

Further, if at any point the VM server runs out of the capacity dedicated to managing and hosting client computer VMs, in one implementation, the controller module looks for opportunities to push out the most expensive VMs in terms of CPU usage and pull in the least expensive VMs from the pull list. More particularly, if the VM server's resources that are assigned to the management of client computer VMs becomes saturated or close to it, the controller module migrates one or more VMs back to their respective client computers to relieve the pressure. Thus, the VM associated with an idle client computer is merely eligible for being consolidated on the VM server and, in fact, might not be if the server does not have the capacity. On the other hand, an VM associated with an active client computer is migrated back to that computer even if the server has the capacity to retain it.

There are two server resource constraints that are of concern. The first is the available memory. Given a total server memory, M, and the allocation, m, made to each VM, the number of VMs that can be hosted on the server is bounded by $n_{RAM}=M/m$. Note that m is the memory allocated to a VM. In one embodiment the memory allocated to a VM, after ballooning, would typically be some minimal value (e.g., 384 MB) that allows the VM to still function.

The second resource constraint arises from CPU usage. Basically, the aggregate CPU usage of all the VMs on the VM server is kept below a threshold. In one implementation, hysteresis in the controller module's control loop is employed to smooth the movement of VMs based on their VM server CPU usage. More particularly, this is accomplished by first measuring the CPU usage as the average over a prescribed averaging period (e.g., 1 minute), and then having a higher threshold, $s_{push}$, for pushing out VMs, than the threshold, $s_{pull}$, for pulling in VMs. The controller module tries to pull in VMs (assuming the pull list is not empty) so long as the aggregate CPU usage is under $s_{pull}$. Then, if the CPU usage rises above $s_{push}$, the controller module pushes back VMs. Thus, there is a bound, $n_{CPU}$, on the number of VMs that can be accommodated such that:

$$\sum_{i=1}^{i=nCPU} x_i \leq s_{push}, \qquad (1)$$

where $x_i$ is the CPU usage of the $i^{th}$ VM.

The total number of VMs that can be consolidated on the VM server is bounded by $\min(n_{RAM}, n_{CPU})$.

Consolidating VMs within the constraints of the VM server's resources can be viewed as a bin-packing problem. For instance, one VM could have high CPU usage but still be deemed idle if only UI activity is considered in determining idleness. There might be the opportunity to push out this VM and instead pull in multiple other VMs from the pull list. The energy consumed by a PC increases only minimally with increasing CPU load. So, consolidating the multiple new VMs in place of the one that is evicted would likely save energy.

Accordingly, if the controller module finds that the VM server resources are saturated (e.g., its CPU usage is greater than $s_{pull}$), it sorts the consolidated VMs based on their CPU usage and, likewise, sorts the VMs on the pull list based on their CPU usage. If the VM with the highest CPU usage in the former list (say $VM^{push}$) has been consuming more of the CPU than two or more VMs (say $VM_1^{pull} \ldots VM_k^{push}$) with the lowest CPU usage from the pull list put together, i.e., $$CPU^{push} \geq \sum_{i=1}^{i=k} CPU_i^{pull}, k \geq 2, \qquad (2)$$

then the controller module does a swap. A swap involves pushing $VM^{push}$ back to its client computer, which is woken up from sleep, and pulling in $VM_1^{pull} \ldots VM_k^{push}$ for consolidation on the server, after which their respective client computers are put to sleep.

Figure 7A:
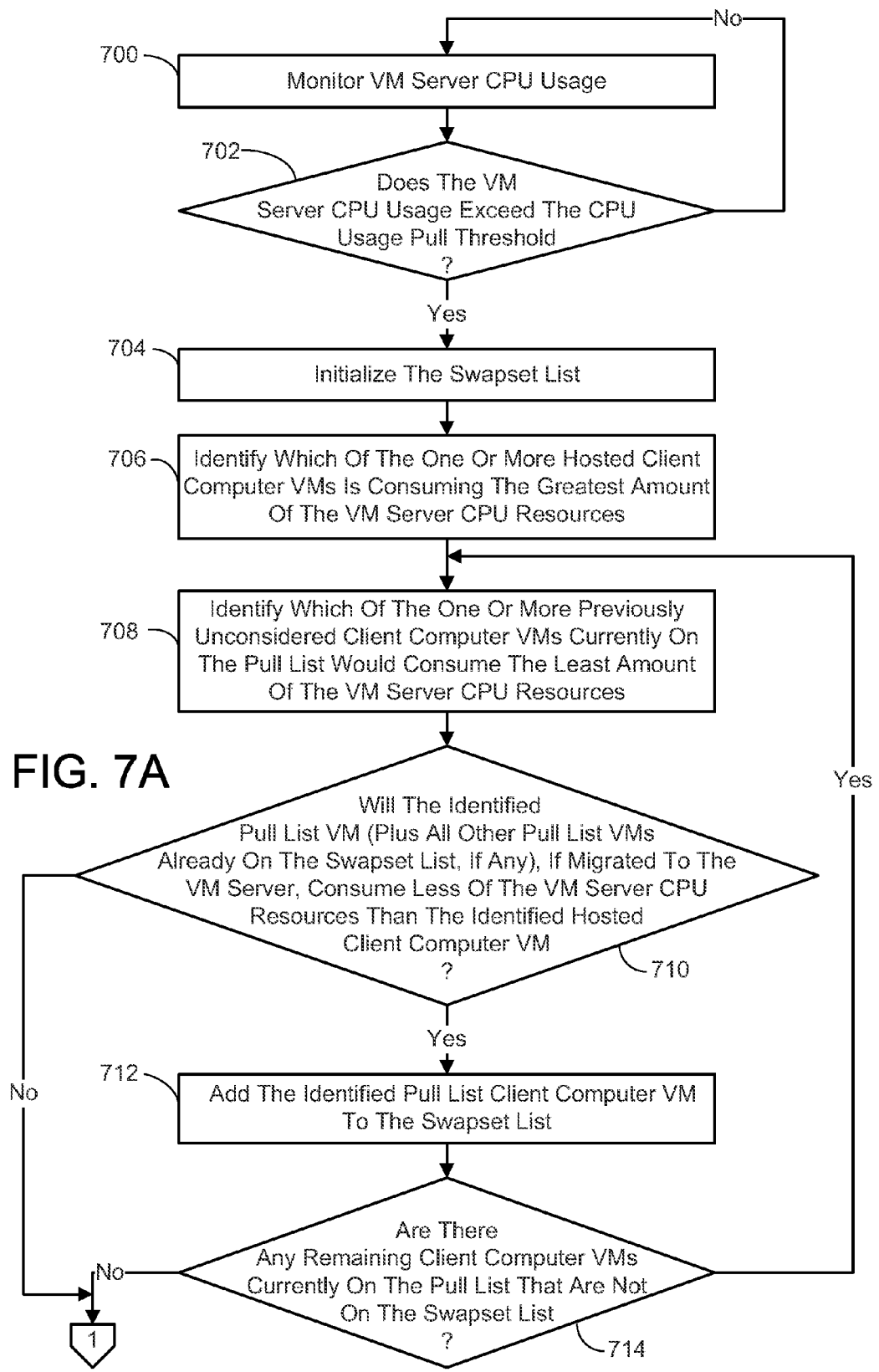
FIGS. 7A-B depict a flow diagram that generally outlines one implementation of a computer-implemented process for the VM server to swap out a hosted client computer VM that is consuming the most amount of the server's central processing unit (CPU) capacity among the hosted VMs, for two or more client computer VMs on the pull list which collectively would consume less of the server CPU capacity than the hosted VM.
Figure 7B:
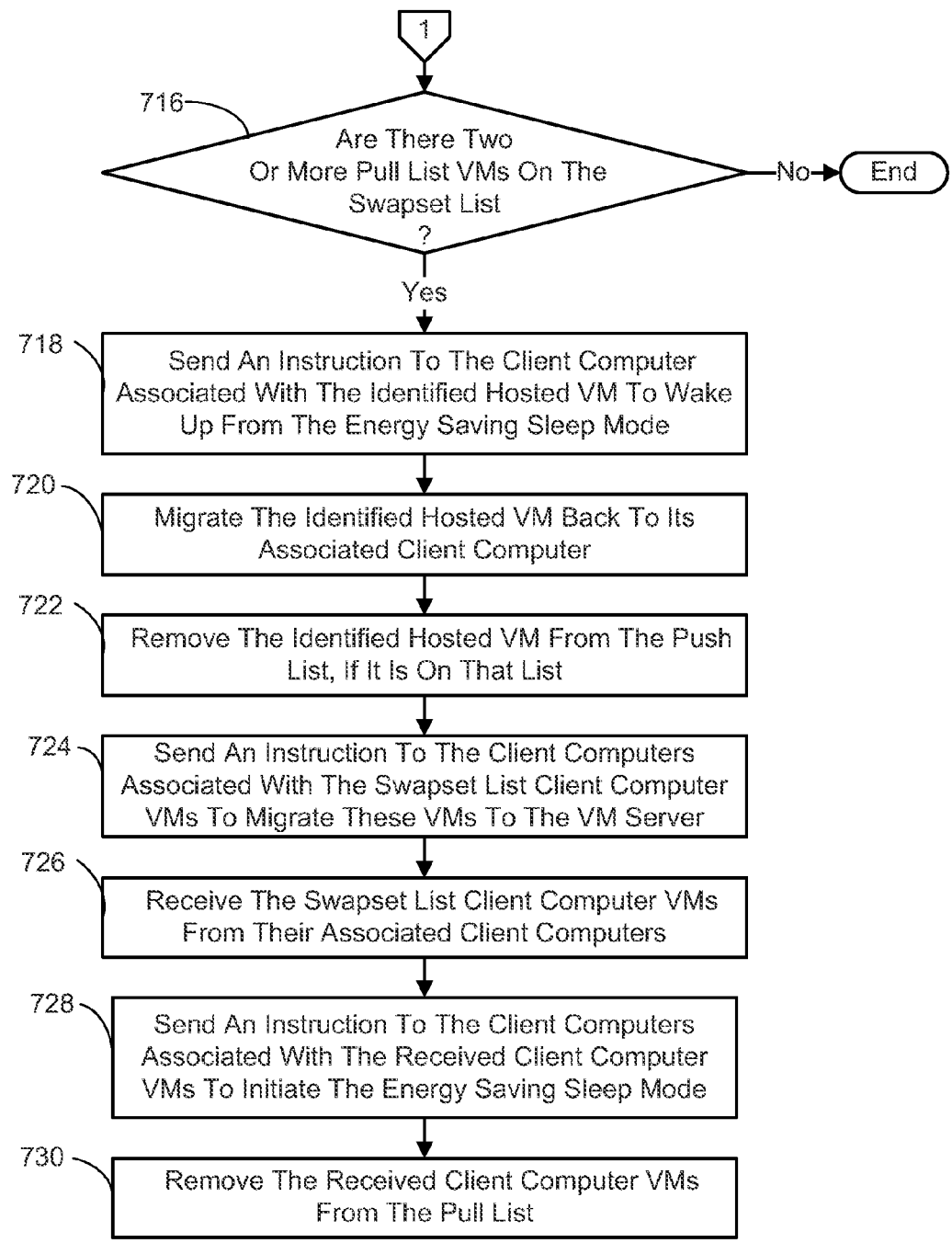

In view of the foregoing, one general implementation for swapping VMs, uses the following process, as illustrated in FIGS. 7A-B. In this exemplary process, the VM server monitors its CPU usage (700) and determines if the VM server CPU usage exceeds the aforementioned prescribed CPU usage pull threshold (702). If not, the monitoring and determination actions continue as shown in FIG. 7A. If, however, it is determined the VM server CPU usage exceeds the prescribed CPU usage pull threshold, then the server initializes a swapset list (704). In this exemplary implementation, initializing the swapset list entails purging it of entries. The VM server then identifies which of the one or more hosted client computer VMs is consuming the greatest amount of the VM server CPU resources (706). In addition, the VM server identifies which of the one or more client computer VMs currently on the pull list would consume the least amount of the VM server CPU resources (708). It is then determined if the currently identified pull list client computer VM (plus all other pull list client computer VMs already on the swapset list if this is not the first iteration), would if migrated to the VM server consume less of the VM server CPU resources than the identified hosted client computer VM (710). If less of the resources would be consumed, the identified pull list client computer VM is added to the swapset list (712), and it is determined if there are any remaining client computer VMs currently on the pull list that are not on the swapset list (714). If there are such pull list VMs, then actions (708) through (714) are repeated for those client computer VMs currently on the pull list that are not on the swapset list. However, if there are no client computer VMs on the pull list that are not also on the swapset list, or if in action (710) it is determined that the currently identified pull list client computer VM (plus all other pull list client computer VMs already on the swapset list if this is not the first iteration), would not, if migrated to the VM server, consume less of the VM server CPU resources than the identified hosted client computer VM, then it is determined if there are two or more pull list client computer VMs on the swapset list (716). If not, then a swap would not result in significant energy saving and the process ends. If, however, there are at least two pull list client computer virtual machines on the swapset list, then an instruction is sent to the client computer associated with the identified hosted client computer VM to wake up from the energy saving sleep mode (718) and the identified hosted client computer VM is migrated back to its associated client computer (720). In addition, the identified hosted client computer VM is removed from the push list if it is on that list (722). An instruction is also sent to the client computers associated with the swapset list client computer VMs to migrate these VMs to the VM server (724). The VM server receives the swapset list client computer VMs from the associated client computers (726), and sends an instruction to the client computers associated with the received client computer VMs to initiate an energy saving sleep mode (728). The received client computer VMs are also removed from the pull list (730).

It is noted that given the heterogeneity of client computer and server physical machines, one question is how CPU usage is measured and how it is normalized across the machines. In one implementation, all measurement of CPU usage, both on the VM server and on the client computers, is made at the hypervisor module level, where the controller module and client computer stubs run, rather than within the guest VMs. Besides leaving the VMs untouched and also accounting for CPU usage by the hypervisor module itself, measurement at the hypervisor module level has the advantage of being unaffected by the configuration of the virtual processors. The hypervisor module also provides a uniform interface to interact with multiple operating systems.

In regards to normalizing measurements made on the client computers with respect to those made on the VM server, this can be handled as follows. When a decision to pull a VM is made based on its CPU usage while running on a client computer, a question arises of what its CPU usage would be once it has been migrated to the VM server. In one implementation, the normalization is done only at the level of cores, treating cores as equivalent regardless of the physical machine. So, for example, a CPU usage of x% on a 2-core client computer would translate to a CPU usage of x/4% on an 8-core VM server.

2.0 The Computing System Environment

A brief, general description of a suitable computing environment in which portions of the energy saving virtualization technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 8:
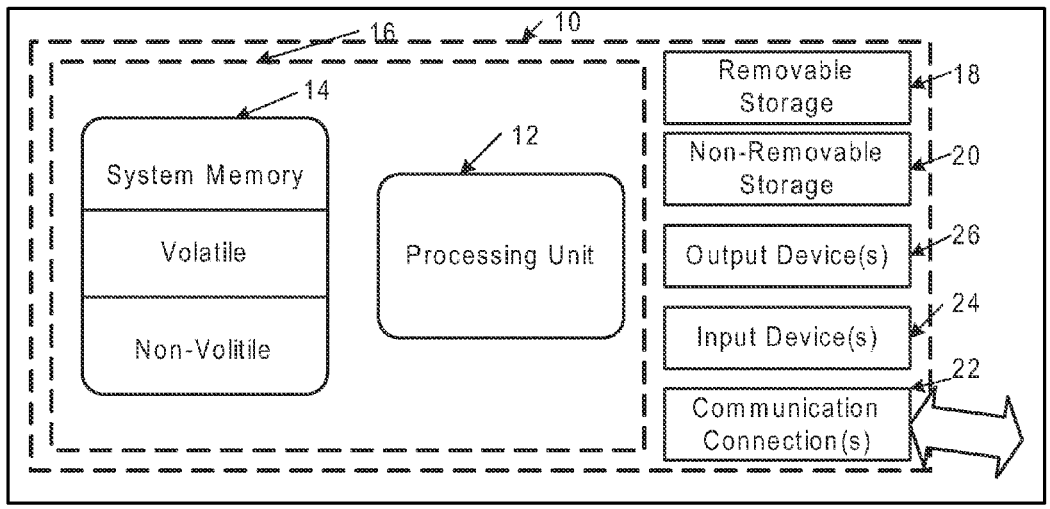
FIG. 8 is a diagram depicting a general purpose computing device constituting an exemplary system for implementing energy saving virtualization technique embodiments described herein.

FIG. 8 illustrates an example of a suitable computing system environment. The computing system environment is only one example of a suitable computing environment and is not intended to suggest any limitation as to the scope of use or functionality of energy saving virtualization technique embodiments described herein. Neither should the computing environment be interpreted as having any dependency or requirement relating to any one or combination of components illustrated in the exemplary operating environment. With reference to FIG. 8, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 8 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 8 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The energy saving virtualization technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that throughout the foregoing description it has been assumed that the client computer is a fully self-contained device (such as a desktop PC). However, with slight modification, the energy saving virtualization technique embodiments described previously can be adapted to a so-called thin client computer. In general, a thin client computer is a computer whose computing session is virtualized in the form of a VM as described in connection with the fully self-contained device client computers. However, in the case of a thin client, its VM is always resident on a remote VM server which is connected to the same computer network as the thin client computer. As such, operations are the same except since the thin client's VM is always on the VM server; the previously described material pertaining to migrating VMs back and forth is not applicable. However, saving energy is still possible even in the case of a thin client computer. More particularly, the thin client computer receives an instruction from the VM server to initiate a client computer sleep mode, whenever it is determined by the VM server that an activity level associated with the thin client computer's VM has fallen below a first prescribed level, or when a lack of UI activity is detected at the thin client computer, thereby indicating the thin client has entered an idle condition. The thin client computer then initiates the sleep mode whenever the aforementioned instruction is received, thereby saving energy when it is idle. Once the thin client computer is in the sleep mode, it will receiving an instruction from the VM server to wake up, whenever it is determined by the VM server that an activity level associated with the thin client computer's virtual machine has exceeded a second prescribed level, or when UI activity is detected at the thin client computer, thereby indicating the thin client has entered an active condition. The thin client then wakes from the sleep mode whenever the instruction to do so is received. It is further noted that a mix of thin clients and self-contained clients (sometimes referred to as thick clients) is possible. For example, administrative personnel may have thin client computers, while developers would have thick client computers.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for saving energy through virtualization of a computer network-connected client computer, comprising:
   using a virtual machine server which is connected to the same computer network as the client computer to perform the following process actions:
   receiving information indicative of a current level of activity of the client computer that is periodically sent from the client computer to the virtual machine server;
   determining if the client computer has entered an idle condition using the periodically received information; and
   if it is determined the client computer has entered an idle condition,
      sending an instruction to the client computer to migrate a virtualization of the client computer's computing session or a portion thereof in the form of a client computer virtual machine to the virtual machine server,
      receiving the client computer virtual machine from the client computer, and
      sending an instruction to the client computer to initiate an energy saving sleep mode.

2. The process of claim 1, wherein the process action of determining if the client computer has entered an idle condition, comprises using the virtual machine server to perform the process actions of:
   monitoring an activity level associated with the client computer using said periodically received information;
   determining if the activity level has exceeded a prescribed level; and
   whenever it is determined that the activity level has not exceeded the prescribed level, designating that the client computer has entered an idle condition.

3. The process of claim 2, wherein the process action of monitoring the activity level associated with the client computer, comprises an action of monitoring user interface activity associated with the client computer, and wherein the process action of determining if the activity level has exceeded a prescribed level, comprises determining if there has been user interface activity occurring within an immediately preceding prescribed period of time and if so deeming the prescribed activity level to have been exceeded.

4. The process of claim 3, wherein the process action of monitoring the activity level associated with the client computer, further comprises an action of monitoring central processing unit (CPU) usage associated with the client computer, and wherein the process action of determining if the activity level has exceeded the prescribed level, further comprises determining if the CPU usage has exceeded a prescribed percentage of a total CPU capacity over said immediately preceding period of time and if so deeming the prescribed activity level to have been exceeded.

5. The process of claim 3, wherein the process action of monitoring the activity level associated with the client computer, further comprises an action of monitoring central processing unit (CPU) usage associated with the client computer, and wherein the process action of determining if the activity level has exceeded the prescribed level, further comprises determining if the CPU usage averaged over a prescribed averaging period during said immediately preceding prescribed period of time has exceeded a prescribed percentage of a total CPU capacity and if so deeming the prescribed activity level to have been exceeded.

6. The process of claim 1, wherein whenever the client computer is in the energy saving sleep mode and its virtual machine is resident in the virtual machine server, said process further comprising using the virtual machine server to perform the process actions of:
   determining if the client computer has re-entered an active condition;
   if it is determined the client computer has re-entered the active condition, migrating the client computer virtual machine back to the client computer.

7. The process of claim 6, wherein the process action of determining if the client computer has re-entered an active condition, comprises using the virtual machine server to perform the process actions of:
   monitoring an activity level associated with the client computer via the client computer's virtual machine that is resident in the virtual machine server;
   determining if the activity level has exceeded a prescribed level; and whenever it is determined that the activity level has exceeded the prescribed level,
designating that the client computer has re-entered an active condition, and
sending an instruction to the client computer to wake up from the energy saving sleep mode.

8. The process of claim 7, wherein the process action of monitoring the activity level associated with the client computer, comprises an action of monitoring user interface activity associated with the client computer, and wherein the process action of determining if the activity level has exceeded a prescribed level, comprises determining if there has been user interface activity occurring within an immediately preceding prescribed period of time and if so deeming the prescribed activity level to have been exceeded.

9. The process of claim 8, wherein the process action of monitoring the activity level associated with the client computer, further comprises an action of monitoring the virtual machine server's central processing unit (CPU) usage attributable to the client computer virtual machine, and wherein the process action of determining if the activity level has exceeded the prescribed level, further comprises determining if the virtual machine server's CPU usage attributable to the client computer virtual machine has exceeded a prescribed percentage of a total virtual machine server's CPU capacity over said immediately preceding prescribed period of time and if so deeming the prescribed activity level to have been exceeded.

10. The process of claim 8, wherein the process action of monitoring the activity level associated with the client computer, further comprises an action of monitoring the virtual machine server's central processing unit (CPU) usage attributable to the client computer virtual machine, and wherein the process action of determining if the activity level has exceeded the prescribed level, further comprises determining if the virtual machine server's CPU usage attributable to the client computer virtual machine, averaged over a prescribed averaging period during said immediately preceding prescribed period of time, has exceeded a prescribed percentage of a total virtual machine server's CPU capacity and if so deeming the prescribed activity level to have been exceeded.

11. The process of claim 6, wherein the client computer has the ability to wake itself up from the energy saving sleep mode under certain conditions independent of the actions of the virtual machine server, and whenever the client computer wakes itself up, it sends a notice to the virtual machine server that the client computer has re-entered the active condition, and wherein said process action of the virtual machine server determining if the client computer has re-entered an active condition, comprises an action of receiving the notice from the client computer that it has re-entered the active condition.

12. A computer-implemented process for saving energy through virtualization of a plurality of computer network-connected client computers, comprising:
using a virtual machine server which is connected to the same computer network as the client computers to perform the following process actions:
(a) for each client computer,
receiving information indicative of a current level of activity of the client computer that is periodically sent from the client computer to the virtual machine server;
periodically determining if the client computer has entered an idle condition using the periodically received information, wherein the client computer is deemed to have entered the idle condition if it exhibits an activity level that falls below a first prescribed level; and
whenever it is determined the client computer has entered an idle condition, adding a virtualization of the client computer's computing session or a portion thereof in the form of a client computer virtual machine that is resident on the client computer to a pull list;
(b) determining if there are one or more client computer virtual machines on the pull list;
(c) whenever it is determined there are one or more client computer virtual machines on the pull list,
identifying which of the one or more client computer virtual machines currently on the pull list is exhibiting the least amount of client computer central processor unit (CPU) usage,
determining if there are sufficient virtual machine server resources available to host the identified client computer virtual machine,
whenever it is determined that sufficient virtual machine server resources are available to host the identified client computer virtual machine, sending an instruction to the client computer associated with the identified virtual machine to migrate that client computer's virtual machine to the virtual machine server,
receiving the identified client computer virtual machine from the associated client computer,
sending an instruction to the client computer associated with the received client computer virtual machine to initiate an energy saving sleep mode,
removing the receiving the identified client computer virtual machine from the pull list; and
(d) periodically repeating action (b), followed by action (c) if appropriate.

13. The process of claim 12, further comprising the process actions of:
(i) for each client computer virtual machine hosted on the virtual machine server,
monitoring an activity level associated with the client computer virtual machine;
determining if the client computer virtual machine exhibits an activity level that exceeds a second prescribed level, wherein said second prescribed activity level is higher than said first prescribed activity level; and
whenever it is determined that client computer virtual machine exhibits an activity level that exceeds the second prescribed level, adding that client computer virtual machine to a push list.
(ii) determining if there are one or more client computer virtual machines on the push list;
(iii) whenever it is determined there are one or more client computer virtual machines on the push list,
scheduling the one or more client computer virtual machines currently on the push list is to be migrated back,
sending an instruction to the client computer or computers associated with the scheduled client computer virtual machine or machines to wake up from the energy saving sleep mode,
migrating the scheduled client computer virtual machine or machines back to the associated client computer or computers, and
removing the migrated client computer virtual machine or machines from the push list; and (iv) periodically repeating action (ii), followed by action (iii) if appropriate.

14. The process of claim 13, further comprising a process action of whenever the virtual machine server central processor unit (CPU) usage exceeds a prescribed CPU usage push threshold, one or more client computer virtual machines resident on the server are migrated back to their respective client computers, in descending order of the client computer virtual machines' consumption of the virtual machine server CPU resources, until the virtual machine server CPU usage falls to a level below said prescribed CPU usage push threshold.

15. The process of claim 13, further comprising the process actions of:
    determining if the virtual machine server central processor unit (CPU) usage exceeds a prescribed CPU usage pull threshold;
    whenever it is determined the virtual machine server central processor unit (CPU) usage exceeds the prescribed CPU usage pull threshold,
    (aa) initialize a swapset list,
    (bb) identifying which of the one or more client computer virtual machines currently hosted on the virtual machine server is consuming the greatest amount of the virtual machine server CPU resources,
    (cc) identifying which of the one or more client computer virtual machines currently on the pull list would consume the least amount of the virtual machine server CPU resources,
    (dd) determining if the currently identified pull list client computer virtual machine, plus all other pull list client computer virtual machines already on the swapset list, if any, would if migrated to the virtual machine server consume less of the virtual machine server CPU resources than the identified hosted client computer virtual machine,
    (ee) whenever it is determined that the currently identified pull list client computer virtual machine, plus all other pull list client computer virtual machines already on the swapset list, if any, would if migrated to the virtual machine server consume less of the virtual machine server CPU resources than the identified hosted client computer virtual machine,
        adding the identified pull list client computer virtual machine to the swapset list, and
        repeating actions (cc) and (dd) for the client computer virtual machines currently on the pull list that are not on the swapset list,
    (ff) whenever it is determined that the currently identified pull list client computer virtual machine, plus all other pull list client computer virtual machines already on the swapset list, if any, would not if migrated to the virtual machine server consume less of the virtual machine server CPU resources than the identified hosted client computer virtual machine,
        determining if there are two or more pull list client computer virtual machines on the swapset list, and
        whenever it is determined there are two or more pull list client computer virtual machines on the swapset list,
            sending an instruction to the client computer associated with the identified hosted client computer virtual machine to wake up from the energy saving sleep mode,
            migrating the identified hosted client computer virtual machine back to its associated client computer,
            removing the identified hosted client computer virtual machine from the push list if the identified hosted client computer virtual machine is on the push list,
            sending an instruction to the client computers associated with the pull list client computer virtual machines on the swapset list to migrate the client computer virtual machines to the virtual machine server,
            receiving the pull list client computer virtual machines on the swapset list from the associated client computers,
            sending an instruction to the client computers associated with the received client computer virtual machines to initiate an energy saving sleep mode, and
            removing the received client computer virtual machines from the pull list.

16. A computer-implemented process for saving energy through virtualization of a computer network-connected client computer, comprising:
    using a client computer to perform the following process actions:
    virtualizing the client computer's computing session or a portion thereof in the form of a virtual machine;
    periodically sending information indicative of a current level of activity of the client computer to a virtual machine server which is connected to the same computer network as the client computer for determination by the virtual machine server if the client computer has entered an idle condition;
    receiving an instruction from the virtual machine server to migrate the client computer virtual machine to the virtual machine server;
    migrating the client computer virtual machine to the virtual machine server whenever said instruction to migrate is received;
    receiving an instruction from the virtual machine server to initiate a client computer sleep mode; and
    initiating the client computer energy saving sleep mode whenever said instruction to initiate the client computer sleep mode is received.

17. The process of claim 16, wherein once the client computer is in the sleep mode, said process further comprising using the client computer to perform the process actions of:
    receiving an instruction from the virtual machine server to wake from the sleep mode;
    waking from the sleep mode whenever said instruction to wake is received; and
    receiving the client computer virtual machine back from the virtual machine server.

18. The process of claim 16, wherein once the client computer is in the sleep mode, said process further comprising using the client computer to perform the process actions of:
    waking itself up from the energy saving sleep mode under certain conditions independent of the actions of the virtual machine server;
    sending a notice to the virtual machine server that the client computer has re-entered an active condition; and
    receiving the client computer virtual machine back from the virtual machine server.

19. The process of claim 18, wherein said certain conditions independent of the actions of the virtual machine server causing the client computer to wake itself up from the energy saving sleep mode, comprises at least one of:
    a user of the client computer being detected within a prescribed vicinity of the client computer; or an occurrence of a prescheduled event; or a prescheduled time.

20. The process of claim 16, wherein the client computer runs a remote desktop program, and wherein said process further comprises a process action of interfacing with the client computer virtual machine through the remote desktop program regardless of whether the client computer virtual machine is resident on the client computer or on the virtual machine server.

\* \* \* \* \*